UNITED STATES PATENT OFFICE.

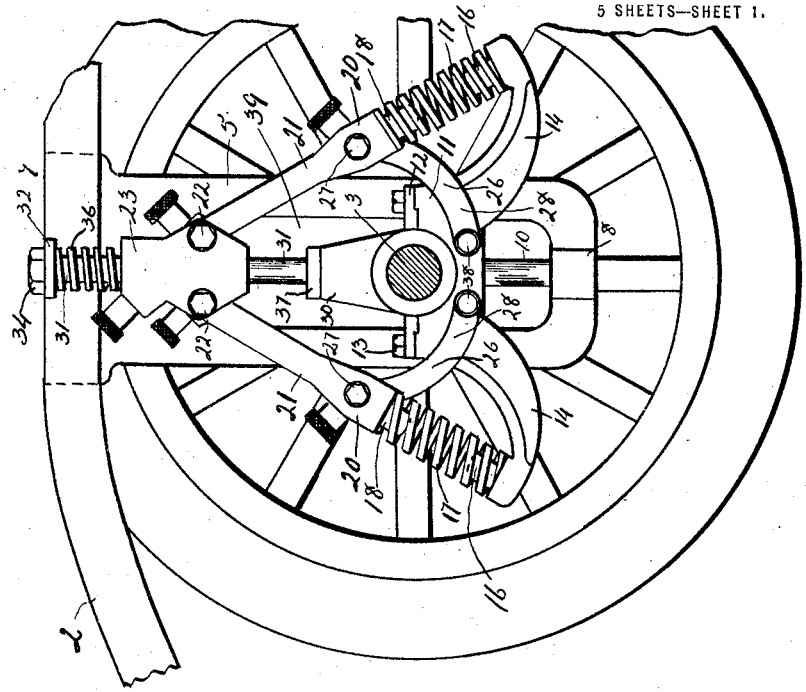

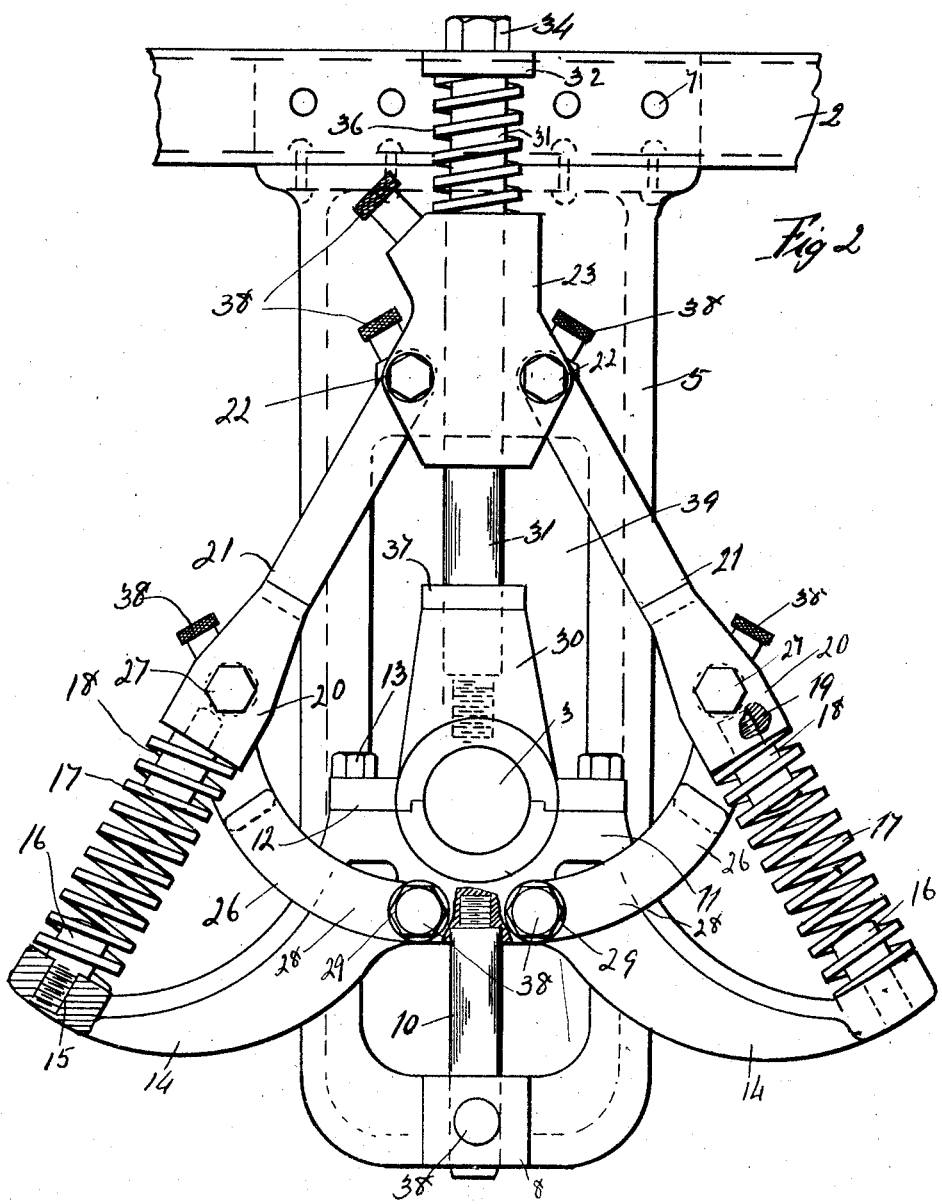

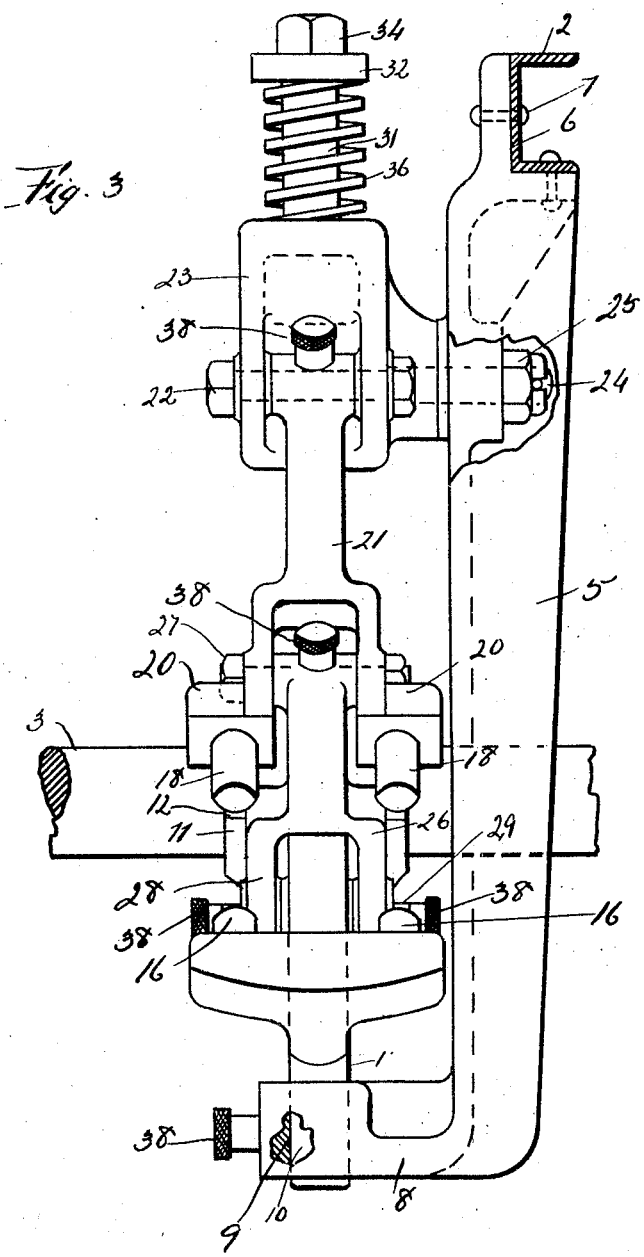

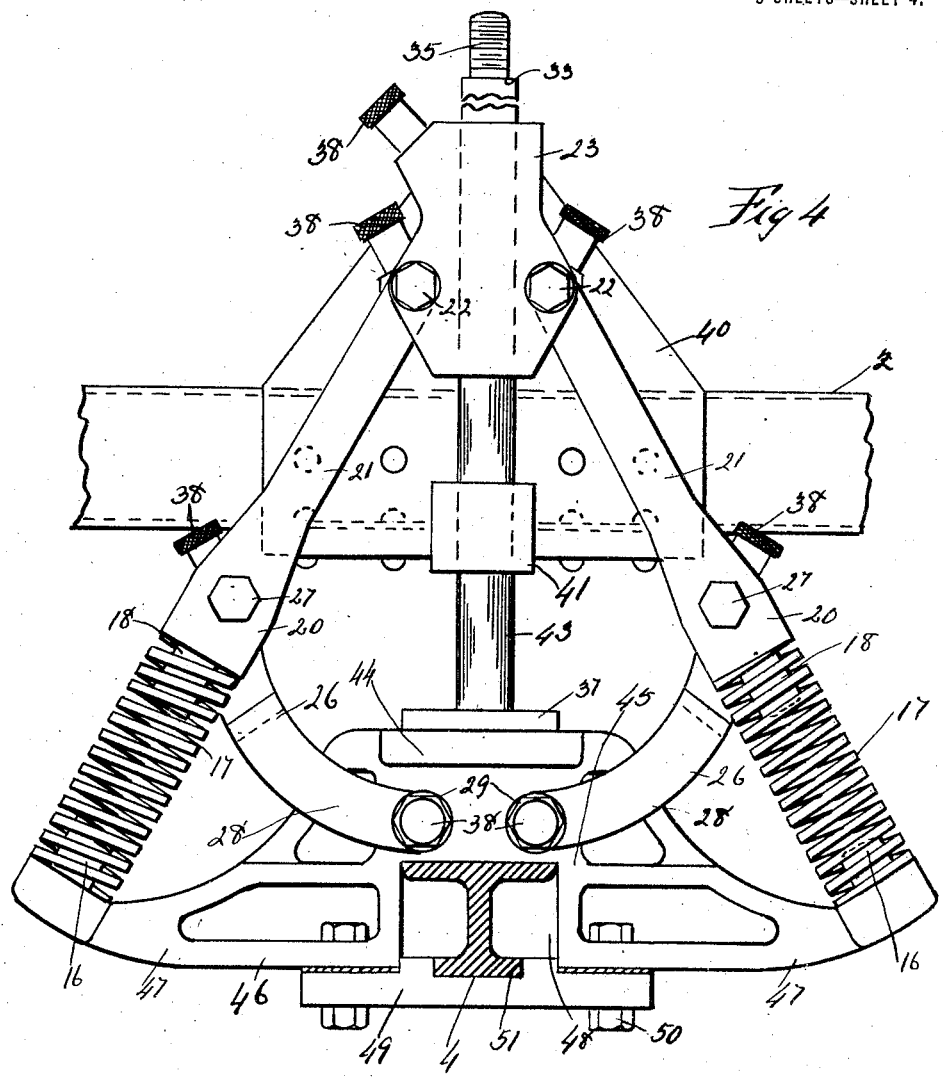

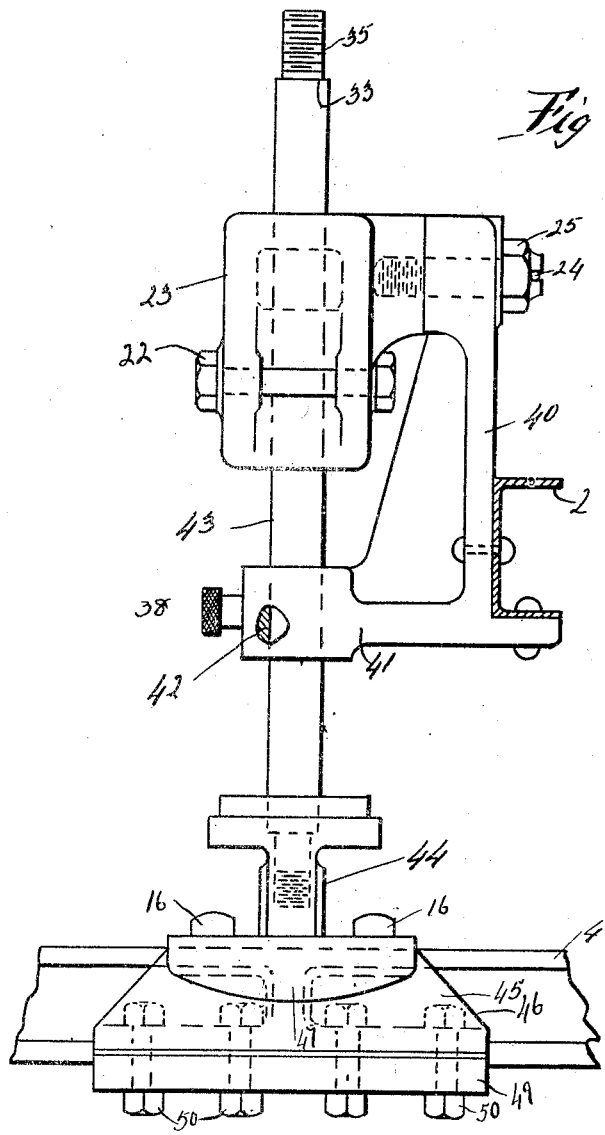

FLETCHER O. BOSWELL, OF PHILADELPHIA, PENNSYLVANIA.

VEHICLE SUSPENSION AND SHOCK-ABSORBER.

1,340,434. Specification of Letters Patent. Patented May 18, 1920.

Application filed July 27, 1917. Serial No. 183,044.

*To all whom it may concern:*

Be it known that I, FLETCHER O. BOSWELL, a citizen of the United States, residing at Philadelphia, in the county of Philadelphia and State of Pennsylvania, have invented new and useful Improvements in Vehicle Suspensions and Shock-Absorbers, of which the following is a specification.

My invention relates to new and useful improvements in a vehicle suspension and shock absorber, and has for its object to provide such a device in combination with both axles of a vehicle whereby the ordinary springs may be displaced and which will absorb the shock incident to the vehicle passing over an uneven road bed or obstruction upon the road.

Another object of the invention is to provide a support in the form of a bracket or hanger adapted to be secured to the chassis of an automobile and support the head to which certain of the toggle levers are pivoted and to also support a guide for a rod.

With these ends in view, this invention consists in the details of construction and combination of elements hereinafter set forth and then specifically designated by the claims.

In order that those skilled in the art to which this invention appertains may understand how to make and use the same, I will describe its construction in detail referring by numerals to the accompanying drawings forming a part of this application in which—

Figure 1, is a fragmentary side elevation of a vehicle chassis with the near side wheels removed to illustrate the location and connection of my improved vehicle suspension and shock absorber to a vehicle.

Fig. 2, is an enlarged side elevation or face view of my improved vehicle suspension and shock absorber constructed for use upon the rear axle of the vehicle.

Fig. 3, is an edge view thereof.

Fig. 4, is a side elevation or face view of a slightly different form or construction of the device designed for use upon the front axle and having certain parts removed, and Fig. 5, is an edge view thereof having the buffer spring and the toggle joint levers removed.

In carrying out my invention as here embodied, 2 represents the frame or chassis of a vehicle, more particularly an automobile while 3 represents the rear axle and 4 the front axle. To the frame or chassis 2 of the vehicle above the rear axle 3 is secured a support 5 in the form of a hanger having a cutaway portion 6 at its upper end to partially fit the chassis to which it is secured by means of rivets 7 or their equivalent and at the lower end of this hanger is an integral outwardly projecting foot 8 having a hole 9 therethrough to act as a guide for the lower rod 10 which is slidably mounted in said hole carried by the lower member 11 of the split bracket which coacts with the upper member 12 of said split bracket, the two being fixed about the rear axle and securely fastened in position by bolts 13 or other equivalent. The lower member 11 is provided with a pair of oppositely projecting depending legs 14 formed integral with said member and having holes 15 in their outer ends in which are threaded the shanks of the studs 16 there being two studs in each leg as plainly shown in Fig. 3. About these studs is placed one end of the springs 17, the other ends of said springs being placed about similar studs 18, the shanks of which are threaded into the holes 19, one of which is formed in each of the arms 20 of the bifurcated end of the upper toggle levers 21, the upper ends of said toggle levers being suitably journaled on bolts 22 or their equivalent passing through the head 23. The head 23 is provided with a stud 24 which passes through the hanger 5 and has a nut 25 threaded thereon, thereby securely fastening the head to the hanger. Between the arms 20 of the bifurcated end of the upper toggle levers 21 are journaled the outer ends of the lower arcuate toggle levers 26 by means of bolts or their equivalent 27, the inner or lower ends thereof being bifurcated as at 28 and straddling the legs 14, said inner ends being journaled on bolts or their equivalent 29 passing through the lower member 11 of the split bracket. With the upper member of the split bracket is formed a projection 30 which carries the upper rod 31, the same having threaded engagement with the projection, the same as the rod 10 which is plainly shown in Fig. 2. The rod 31 passes through the head 23 and projects some distance above said head and on this upper end of the rod is mounted a washer or disk 32 which rests against a shoulder 33 and shown in Fig. 4, said washer or disk being held in place by a nut 34 or its equivalent secured on the threaded reduced end 35 of the rod. Between the disk or washer 32 and the head 23 is arranged a buffer spring 36, the same being coiled about the projecting end of the rod 31, and if found desirable, a rubber buffer 37 may be placed about the rod 31 so as to rest upon the end of the projection 30, in case the movement of the parts should be so great that the head 23 would contact with the projection 30.

It is to be noted that the inner ends of the lower toggle levers 26 are journaled at points below the axle 3 of the vehicle and all the movable parts are suitably lubricated by a suitable lubricant contained in desirable lubricant containers, such as cups 38.

In the operation of this device when the distance between the vehicle frame or chassis and the axle 3 is decreased, the rod 31 will slide in the head 23 and the rod 10 will slide in the foot 8 which will move the inner pivoted points of the lower toggle levers 26 toward the upper pivoted points of the upper toggle levers 21, thereby increasing the distance between the pivot points of the toggle levers where they are fastened together so that said pivot points are moved outward and toward the outer ends of the legs 14 thereby decreasing the distance between the lower ends of the upper toggle levers and the ends of said legs causing the springs 17 to be depressed or contracted. This action is caused by the wheels of the vehicle passing over an uneven road bed or coming in contact with some obstruction and the shock incident thereto will be absorbed by the springs 17. After the unevenness or obstruction is passed, the springs 17 will expand and return the parts to their normal positions, and this action of the springs 17 is counterbalanced by the buffer spring 36, thus preventing a too sudden return of the parts to their normal positions. Any sudden downward movement of the axle 3 caused by the wheels dropping into a depression in the road bed will draw the disk or washer 32 toward the head 23 and compress the spring 36 which will absorb the shock and prevent its transmission to the vehicle frame, the body thereon or the occupants thereof. The hanger being attached to the vehicle frame or chassis with its longitudinal or vertical center in alinement with the center of the rear axle 3, said hanger is provided with an elongated opening 39 through which the axle passes.

In Figs. 4 and 5, I have shown the details of construction of the forward suspension and shock absorber in which 40 denotes the support in the form of an upstanding bracket secured adjacent its lower end to the vehicle frame or chassis 2 and has a foot 41 projecting from its lower end in which is formed a hole 42 to act as a guide for the rod 43, the same passing through the foot 41 and the head 23 which is identical in construction to the head shown in Figs. 2 and 3. This rod is slidably mounted in these parts and its lower end is screwed into the projection 44 carried by the upper member 45 of the split bracket 46, said upper member also carrying the legs 47 for the same purpose as the legs 14 in the other form of the device and has a chamber 48 in its underside for the reception of the front axle 4. To the under side of the upper member 45 is fastened the lower member or clamping plate 49 by means of bolts 50 or their equivalent, and this clamping plate passes beneath the axle 4 and preferably as a groove 51 therein for registration with a portion of the axle. All of the other parts are identical in construction to those shown in Figs. 2 and 3, and their operation is also just the same with the exception that the lower or inner ends of the toggle levers 26 are journaled to the split bracket above the axle instead of below the same which is made necessary because of the short distance between the front axle of the automobile and the wheel base. In practice one of the shock absorbers is applied at each end of each axle.

The operation of this form of the invention is as follows:—

When the axle 4 is moved toward the vehicle frame or chassis 2 so as to decrease the distance therebetween, the rod 43 will be moved upward through the foot 41 and the head 23 which will bring the inner ends of the toggle levers 26 closer to the pivot points of the upper toggle levers or the head 23, thus increasing the distance between the points where the toggle levers are pivoted to each other, causing a compression of the springs 17 which will absorb the shock incident to the movement of the front axle toward the vehicle frame or chassis.

From the foregoing, it will be noted that I have produced a construction for vehicle suspension which will entirely eliminate the ordinary use of the springs and which will absorb the shock incident to ordinary travel over uneven roadways thereby making it unnecessary to use shock absorbers in addition to the ordinary springs.

Of course, I do not wish to be limited to the exact details of construction as herein shown as these may be varied within the limits of the appended claims without departing from the spirit of my invention.

Having thus fully described my invention, what I claim as new and patentable is—

1. A vehicle suspension and shock absorber comprising in combination with a vehicle and the axle thereof, a support secured to the vehicle in the region of an axle, a foot formed with the support to act as a guide, a head detachably secured to the support, a split bracket detachably secured to the end of the axle, means carried by the split bracket having sliding engagement with the foot of the support and the head, legs projecting from the split bracket, toggle levers pivoted to the head and the split bracket and a plurality of springs arranged between the horizontal pivot points of the toggle levers and the legs of the split bracket.

2. A vehicle suspension and shock absorber comprising in combination with a vehicle and the axles thereof, a support secured to the vehicle in the region of an axle, a foot formed with the support to act as a guide, a head detachably secured to the support, a split bracket secured to the end of the axle, means carried by the split bracket having sliding engagement with the foot of the support and the head, legs projecting from the split bracket, a pair of studs having threaded engagement with each leg of the split bracket, studs having threaded engagement with each of the toggle levers in the region of the horizontal pivot points and springs located between the horizontal pivot points of the toggle levers and the split bracket and having their ends surrounding the studs.

3. A vehicle suspension and shock absorber comprising in combination with a vehicle and the axles thereof, a support secured to the vehicle in the region of the end of an axle, a head carried by the support, a split bracket secured to the end of the axle, means carried by the split bracket having sliding engagement with the support, and head, said means projecting above said head, resilient means coacting with the first named means and the head, toggle levers pivoted to the head, and the split bracket and resilient means arranged between the horizontal pivot points of the toggle levers and the split bracket.

4. A vehicle suspension and shock absorber comprising in combination with a vehicle and the axles thereof, a support secured to the vehicle in the region of the end of an axle, a head carried by the support, a split bracket secured to the end of the axle, a rod carried by the split bracket, and having sliding engagement with the head, the upper end of said rod projecting beyond the head, a disk or washer carried by the upper or outer end of the rod, a spring located between said disk and the head, toggle levers pivoted to the head and the split bracket, legs projecting from said split bracket and springs arranged between the horizontal pivot points of the toggle levers and said legs.

5. In a device of the character stated, the combination with a vehicle frame and the front and rear axles thereof, a support secured to the vehicle frame at the front end thereof and having a portion projecting above said frame, an outwardly projecting foot having a hole therethrough formed integral with said support, a head for said support, means for detachably securing the head to the support, a split bracket passing through the opening of the foot of the support and the head, the upper or outer end of said rod projecting beyond the head and having a reduced threaded portion, a disk or washer located on said reduced portion, a nut screwed thereon for holding the washer in place, a spring located between the washer and the head for normally forcing the head away from the end of the rod, a pair of oppositely disposed legs formed integral with the split bracket, a pair of studs having threaded engagement with the ends of said legs, a pair of oppositely disposed lower levers having their lower ends bifurcated to straddle portions of the split bracket, bolts for pivoting the ends of said lower levers to the split bracket above the axle, other levers, bolts for pivoting the upper ends of said levers to the head, the lower ends of said upper levers being bifurcated and straddling the upper or outer ends of the other coacting lower levers, bolts for pivoting the lower ends of the upper levers to the upper ends of the lower levers, studs having threaded engagement with each of the bifurcated ends of each of the upper levers and each of the coacting legs, said springs surrounding the studs, a rubber buffer surrounding the rod and located between the split bracket and the foot of the support, another support secured to the vehicle frame in the region of the rear axle and depending from said frame, said support having an opening therein for the reception of the rear axle, an outwardly projecting foot formed integral with the last named support, the foot having a hole therethrough, a split bracket secured to an end of the rear axle, a rod carried by the split bracket projecting downwardly therefrom and passing through the opening in the foot of the support, a head for the last named support, means for detachably securing the head to the support, an upper rod carried by the last named split bracket and passing through the head, the upper or outer end of said rod projecting beyond the head and having a reduced threaded portion, a disk or washer located upon said reduced portion of the rod, a nut screwed on said rod for holding the washer in place, a spring located between the washer and head for normally forcing the head away from the end of the rod, a pair of oppositely disposed legs formed integral with the split bracket, a pair of studs having threaded engagement with the ends of said legs, a pair of oppositely disposed lower levers having their lower ends bifurcated to straddle portions of the split bracket, bolts for pivoting the ends of said levers to the split bracket above the axle, other levers, bolts for pivoting the upper ends of said levers to the head, the lower ends of said upper levers being bifurcated and straddling the upper or outer ends of the other coacting lower levers, bolts for pivoting the lower ends of the upper levers to the upper ends of the lower levers, studs having threaded engagement with each of the bifurcated ends of each of the upper levers, a pair of springs located between the lower ends of each of the upper levers and each of the coacting legs, said springs surrounding the studs, and a rubber buffer surrounding the rod and located between the split bracket and the foot of the support.

6. A vehicle suspension and shock absorber comprising in combination with a vehicle and the axles thereof, a support secured to the vehicle in the region of an axle, a head carried by the support, a split bracket detachably secured to an end of the axle, means carried by the split bracket having sliding engagement with the support and head, toggle levers pivoted to the head and the split bracket, and springs arranged between the horizontal pivot points of the toggle levers and the split bracket.

In testimony whereof I have hereunto affixed my signature.

FLETCHER O. BOSWELL.